United States Patent [19]

Baker

[11] B 3,925,484
[45] Dec. 9, 1975

[54] PROCESS FOR MAKING POLYTETRAMETHYLENE ETHER GLYCOL HAVING A NARROW MOLECULAR WEIGHT DISTRIBUTION

[75] Inventor: Melvin C. Baker, Youngstown, N.Y.

[73] Assignee: E. I. Du Pont de Nemours and Company, Wilmington, Del.

[22] Filed: Nov. 8, 1973

[21] Appl. No.: 414,129

[44] Published under the Trial Voluntary Protest Program on January 28, 1975 as document no. B 414,129.

[52] U.S. Cl. ............... 260/615 B; 260/346.1 R
[51] Int. Cl.² ......................................... C07C 41/00
[58] Field of Search ................. 260/615 B, 346.1 R

[56] References Cited
UNITED STATES PATENTS

| | | | |
|---|---|---|---|
| 2,751,419 | 6/1956 | Hill et al. | 260/615 B |
| 3,358,042 | 12/1967 | Dunlop et al. | 260/6.5 B |
| 3,359,332 | 12/1967 | Johnston | 260/615 B |
| 3,461,169 | 8/1969 | Davis et al. | 260/615 B X |
| 3,467,679 | 9/1969 | Rogers | 260/346.1 R |
| 3,478,109 | 11/1969 | McConnell | 260/6.5 B X |

Primary Examiner—Howard T. Mars

[57] ABSTRACT

Polytetramethylene ether glycol having a narrow molecular weight distribution of about 1.30 to 1.70 is made by a process comprising (1) partially depolymerizing polytetramethylene ether glycol to tetrahydrofuran in the presence of a cross-linked acid form ion exchange resin at a temperature of about 120° to 150°C while removing a major portion of the tetrahydrofuran produced, (2) cooling to about 70° to 90°C., (3) filtering to remove the resin from the polytetramethylene ether glycol, and (4) drying under reduced pressure. The narrow molecular weight polytetramethylene ether glycol made thereby has a number average molecular weight of about 1600–3200 and a viscosity of about 4–20 poise at 40°C. It is useful in making polyurethane fibers and films.

4 Claims, No Drawings

PROCESS FOR MAKING POLYTETRAMETHYLENE ETHER GLYCOL HAVING A NARROW MOLECULAR WEIGHT DISTRIBUTION

BACKGROUND OF THE INVENTION

This invention relates to a method of producing polytetramethylene ether glycol having a narrow molecular weight distribution.

Canadian Pat. No. 800,659 issued to Stanin et al. in 1968 and Seaton et al., Def. Pub. T878,004 of Ser. No. 883,666, published in 878 O.G. 239 in Sept. 1970 disclose a polytetramethylene glycol of a narrow molecular weight distribution having a number average molecular weight within the range of 1000 to 6000. The narrow molecular weight distribution polytetramethylene ether glycol disclosed therein is made by a process involving the polymerization of tetrahydrofuran with an appropriate catalyst and under appropriate conditions for a period of time less than the time which is required for the polymerization reaction to reach equilibrium. In Canadian Pat. No. 800,659 the polytetramethylene of narrow molecular weight distribution is disclosed to have a percent deviation of molecular weight of less than 20 percent.

SUMMARY OF THE INVENTION

A process has been discovered whereby polytetramethylene ether glycol having a narrow molecular weight distribution can be made.

Specifically, it has been found that polytetramethylene ether glycol having a narrow molecular weight distribution of about 1.30 to 1.70, a number average molecular weight of about 1600–3200 and a viscosity of about 4–20 poise at 40°C. can be made by a process comprising (1) partially depolymerizing polytetramethylene ether glycol having a number average molecular weight within the range of about 600–2200 and preferably within the range of about 800–2100 to tetrahydrofuran in the presence of a cross-linked acid form ion exchange resin at a temperature of about 120°–150°C. while removing a major portion of the tetrahydrofuran produced thereby (2) cooling to about 70° to 90°C., (3) filtering to remove the resin from the hydrolyzed polytetramethylene ether glycol, and (4) drying under reduced pressure to essentially remove the remaining tetrahydrofuran.

The process of the invention provides a narrow molecular weight distribution polytetramethylene ether glycol having a lower bulk viscosity than does ordinary polytetramethylene ether glycol, such as the commercial product made as described hereinbelow, at the same average molecular weight. The ultimate viscosity attained at any particular average molecular weight is lower than that achieved prior to the process of the invention.

DESCRIPTION OF THE INVENTION

Polytetramethylene ether glycol, hereinafter called PTMEG, is made by polymerizing tetrahydrofuran in the presence of an acid catalyst, such as fluosulfonic acid. The polymerization is terminated by the use of water as a terminating agent. Polytetramethylene ether glycol made by the above method or purified polytetramethylene ether glycol made by the process disclosed in U.S. Pat. No. 2,751,419 is the starting material for the process of the invention.

The molecular weight distribution of the polytetramethylene ether glycol produced by the above described prior art methods is quite broad, non-Gaussian and skewed toward higher molecular weight fractions. The molecular weight distribution is defined as the ratio of the weight average molecular weight to the number average molecular weight. The number average molecular weight is defined as the weight of a sample divided by the number of molecules. For the weight average molecular weight the summation of the total weight of each fraction multiplied by the molecular weight of the fraction is divided by the summation of the weight of each fraction. The theoretically predicted value of the molecular weight distribution for polytetramethylene ether glycol is 1.96, with which measured values of the starting material agree within experimental error.

A close approximation of the molecular weight distribution of PTMEG can be obtained from measurement of the bulk viscosity and the number average molecular weight. The bulk viscosity may be measured by known techniques. The number average molecular weight is measured by reacting the PTMEG with acetic anhydride in pyridine and titrating any excess acid resulting therefrom with a standard sodium hydroxide solution. This procedure gives a hydroxyl number which is equivalent to the number average molecular weight.

The approximate molecular weight distribution can be obtained from the ratio of the viscosity average molecular weight to the number average molecular weight. The viscosity average molecular weight ($M_{vis}$) is calculated from the following empirical relationship which is based on both experimental data and theory and is for bulk solution viscosities measured at 40°C.

$$M_{vis} = \text{antilog}(0.493 \log \text{viscosity} + 3.0646)$$

This relationship finds its basis in the fact that for monodispersed systems the viscosity is linearly dependent on the molecular weight, whereas for a polymer with a wide molecular weight distribution the viscosity increases exponentially with molecular weight. Therefore, for a polydispersed polymer, the viscosity is greater than for a monodispersed sample of the same structure and same number average molecular weight.

Hence, by measuring the viscosity and number average molecular weight of any PTMEG sample a close approximation of the molecular weight distribution may be obtained. It is to be understood that molecular weight distribution as used herein means the distribution measured by the technique described hereinabove.

The number average molecular weight of the starting PTMEG which may be used in the process of the invention can vary from about 600 to 2200 and is preferably about 800 to 2100.

Any cross-linked ion exchange resin having acidic functional groups can be utilized in the process of the invention. Suitable commercial materials are the sulfonated styrene-divinyl benzene copolymers, such as "Dowex" 50×16, which is a product of the Dow Chemical Co., and "Amberlite IR-112", which is a product of the Rohm and Haas Co.

The amount of resin used in the process of the invention can range from about 3–7% by weight of the amount of starting PTMEG. Although the PTMEG will generally be anhydrous, the process disclosed herein will also work with wet PTMEG and water-wet ion exchange resin, since the water would distill off as the temperature approached 120°C.

In the process of the invention the resin and PTMEG starting material are combined in a system under an inert atmosphere. The purpose of the inert atmosphere is to prevent oxidation of the PTMEG and the tetrahydrofuran product during the reaction. The temperature is raised rapidly to about 120°C. at which temperature the PTMEG begins to dopolymerize to tetrahydrofuran. The temperature is held at about 120°–150°C. until the desired amount of depolymerization of the PTMEG to tetrahydrofuran occurs while simultaneously therewith the tetrahydrofuran produced by the depolymerization of hydrolysis is removed by distillation. After the desired amount of tetrahydrofuran has been removed, the system is cooled to about 70°–90°C. and the ion exchange resin is removed by filtration, after which the product of the invention is dried under reduced pressure of about 1–100 mm. of mercury in order to remove residual tetrahydrofuran.

As stated hereinabove, the temperature at which hydrolysis is conducted can vary from about 120° to 150°C. Increasing the temperature causes an increase in the rate of hydrolysis. However, the higher temperatures of the above range are less favorable, since the thermal limit of the sulfonic acid type ion exchange resin is about 150°C., and decomposition of the resin would contaminate the product of the invention. The preferred temperature range for performing the hydrolysis is from about 120° to 135°C.

The rate of hydrolysis increases with the ion exchange resin concentration without materially affecting the molecular weight distribution of the PTMEG produced by the process of the invention. The rate of hydrolysis diminishes with increasing number average molecular weight of the starting PTMEG. Since it is believed that the process of the invention is based upon diffusion of lower molecular weight species into the resin beads and subsequent hydrolysis of said species, the decrease in hydrolysis rate with increasing molecular weight is attributed to a decrease in the number of lower molecular weight species as the number average molecular weight increases.

In accordance with the above concept, the product of the invention always has a higher number average molecular weight than does the starting material. The number average molecular weight obtained depends upon the degree of conversion of the starting PTMEG to PTMEG having a narrow molecular weight distribution. In general the narrow molecular weight distribution PTMEG produced by the process of the invention has a number average molecular weight of about 1600–3200.

The molecular weight distribution of the product of the invention narrows with the degree of hydrolysis of the starting PTMEG until a certain degree of conversion is achieved. Thereafter the molecular weight distribution appears to remain within a range of about from 1.30 to 1.40. The degree of conversion or hydrolysis necessary to reach this range of molecular weight distribution depends upon the number average molecular weight of the starting material. For example, 40% hydrolysis of starting PTMEG having a number average molecular weight of 975 results in a product of the invention with a molecular weight distribution between 1.3 and 1.4. The molecular weight distribution of this resulting material is not appreciably affected by further hydrolysis.

It is apparent from the preceding explanation that by varying the degree of hydrolysis, PTMEG having a narrow molecular weight distribution of about from 1.30 to 1.70 can be obtained. The degree of hydrolysis necessary to narrow the molecular weight distribution of the starting PTMEG below 1.70 varies with its number average molecular weight. For instance, 17.0% hydrolysis of a starting material having a number average molecular weight of 2050 results in PTMEG having a narrow molecular weight distribution of 1.61, whereas 26.4% hydrolysis of starting PTMEG having a number average molecular weight of 1530 gives a narrow molecular weight distribution of 1.50. Generally, the degree of conversion should be at least 15 weight percent of the starting PTMEG although this amount is not considered to be limiting. In a preferred embodiment of the invention the process disclosed herein is operated to obtain PTMEG product having a molecular weight distribution of about 1.30 to 1.40.

The product of the process of the invention has a viscosity significantly lower than that of ordinary PTMEG of the same number average molecular weight. The viscosity ranges from about 4.0–20 poise at 40°C. In general the product produced by the process disclosed herein can be used in making polyurethane fibers and films by known techniques.

The invention is further described by the following examples which are not intended to limit the invention in any manner.

EXAMPLE 1

Three hundred fifty ml. of acid "Dowex" 50 × 16, ion exchange resin which has a particle size of 50–100 mesh based on the U.S. Standard Sieve Series, was treated with 50 ml. of concentrated HCl and washed with water until the effluent was neutral. This treatment was repeated two more times. The resin was dried in an air oven at 50°–60°C. overnight. It analyzed at 4–4.3 meq. $H^+$/gm.

The above described resin and starting PTMEG having a number average molecular weight of 975 were added to a 3-necked flash equipped with stirring, a thermometer, nitrogen inlet, and a take-off condenser. The concentration of resin was 3% based on the weight of the PTMEG. After adding the PTMEG and resin, the temperature was raised rapidly to 120°C. at which temperature the PTMEG began to hydrolyze to tetrahydrofuran. The temperature was held around 130°C. The tetrahydrofuran produced thereby was weighed as it distilled off to determine the amount of conversion. After a predetermined amount of tetrahydrofuran was taken off so that 43% conversion was obtained, the system was cooled to about 70° to 90°C., after which the residual tetrahydrofuran was removed at low pressure for about one-half hour.

The system was purged with nitrogen and weighed to determine the overall conversion of PTMEG to tetrahydrofuran. The remaining reaction mixture was filtered using a Buchner funnel and No. 1 Whatman paper. The resulting narrow molecular weight distribution PTMEG had a number average molecular weight of 1764, a molecular weight distribution (MWD) of 1.38, and a viscosity of 4.71 poise.

EXAMPLES 2–9

The following experiments were performed according to the procedure of Example 1 and with the starting materials described therein with the exceptions given in Table 1.

TABLE I

| Example | % Resin | Hours | Temp. Range | % PTMEG Converted to Tetrahydrofuran | M.W. | Viscosity at 40°C. (Poise) | M.W.-D. |
|---|---|---|---|---|---|---|---|
| 2 | 3.0 | 2.6 | 120–136 | 43.0 | 1790 | 4.09 | 1.30 |
| 3 | 3.0 | 1.5 | 126–148 | 55.1 | 1196 | 5.61 | 1.36 |
| 4 | 3.0 | 2.5 | 120–134 | 43.2 | 1694 | 4.55 | 1.45 |
| 5 | 3.0 | 2.5 | 131–132 | 41.5 | 1645 | 4.44 | 1.47 |
| 6 | 3.0 | 2.5 | 120–132 | 42.5 | 1702 | 4.49 | 1.43 |
| 7 | 3.0 | 2.2 | 120–130 | 42.9 | 1748 | 4.77 | 1.43 |
| 8 | 4.6 | 1.2 | 124–149 | 46.8 | 1843 | 4.88 | 1.38 |
| 9 | 3.5 | 1.2 | 130–154 | 43.8 | 1730 | 4.64 | 1.43 |

EXAMPLE 10

The following experiment was performed according to the procedure of Example 1 but using PTMEG having a number average molecular weight of 2050 and "Amberlite IR-112" H$^+$ resin, which is a product of Rhom and Haas Co. The amount of resin used was 3.0% based on the weight of PTMEG starting material. The hydrolysis was conducted for 3.0 hours in order to effect 17.0% conversion of the PTMEG to tetrahydrofuran at 135°–136°C. The resulting narrow molecular weight distribution PTMEG had a number average molecular weight of 3067, a viscosity of 18.89 and a molecular weight distribution of 1.61.

The invention claimed is:

1. A process for producing polytetramehylene ether glycol having a narrow molecular weight distribution of about 1.30–1.70, a number average molecular weight of about 1600–3200 and a viscosity of about 4.0–20 poise at 40°C., said process comprising the steps of (1) partially depolymerizing at a temperature from about 120°–150°C. polytetramethylene ether glycol starting material having a number average molecular weight of about 600–2200 in the presence of a cross-linked ion exchange resin in acid form to produce tetrahydrofuran and removing the tetrahydrofuran by vaporization as formed said depolymerization being conducted to an extent sufficient to obtain said narrow molecular weight distribution polytetramethylene ether glycol and said resin being present at about 3–7 percent based upon the weight of starting polytetramethylene ether glycol, (2) cooling to about 70°–90°C., (3) filtering the polytetramethylene ether glycol to remove the resin therefrom, and (4) removing any remaining tetrahydrofuran at a low pressure of about 1–100 mm. of mercury.

2. A process of claim 1 wherein the temperature for depolymerization is from about 120° to 135°C. and the number average molecular weight of the starting polytetramethylene ether glycol is about 800–2100.

3. A process of claim 2 wherein the molecular weight distribution of the polytetramethylene ether glycol produced thereby is about from 1.30 to 1.40.

4. A narrow molecular weight distribution polytetramethylene ether glycol having a molecular weight distribution of about 1.30 to 1.40, a number average molecular weight of about 1600–3200 and a viscosity of about 4.0–20 poise at 40°C.

* * * * *